Nov. 15, 1949 J. KELLOGG 2,488,086
FLUID PRESSURE SYSTEM
Filed Aug. 27, 1945 3 Sheets-Sheet 1

Inventor:—
Joseph Kellogg.
BY Eugene W. Simpson.
Attorney.

Nov. 15, 1949 J. KELLOGG 2,488,086
FLUID PRESSURE SYSTEM
Filed Aug. 27, 1945 3 Sheets-Sheet 2

Inventor:
Joseph Kellogg
By Eugene W. Simpson
Attorney.

Nov. 15, 1949  J. KELLOGG  2,488,086
FLUID PRESSURE SYSTEM
Filed Aug. 27, 1945  3 Sheets-Sheet 3
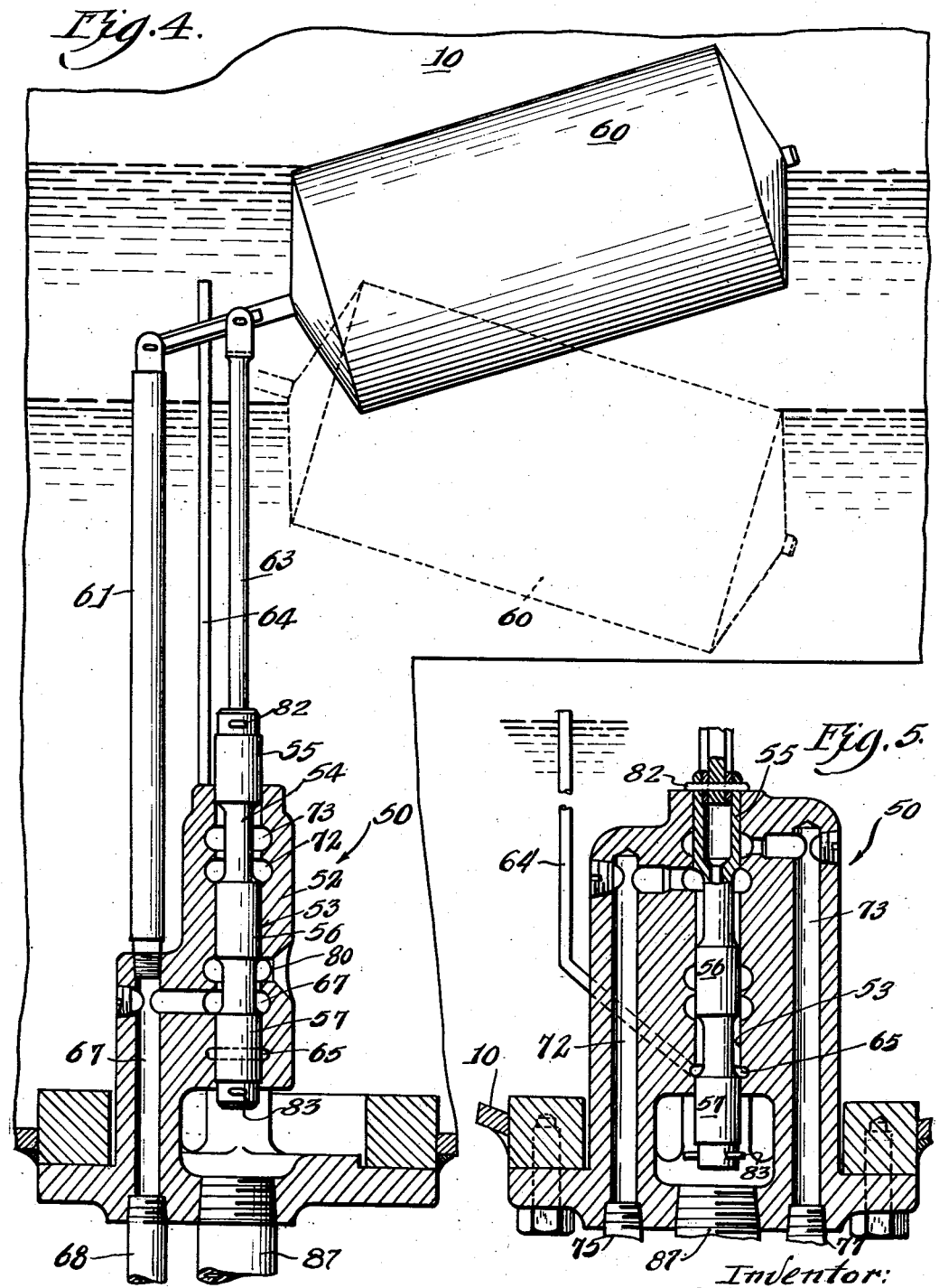
Inventor:
Joseph Kellogg
By Eugene N. Simpson
Attorney.

Patented Nov. 15, 1949

2,488,086

UNITED STATES PATENT OFFICE 2,488,086

FLUID PRESSURE SYSTEM

Joseph Kellogg, Milwaukee, Wis., assignor to Nordberg Manufacturing Company, Milwaukee, Wis., a corporation of Wisconsin Application August 27, 1945, Serial No. 612,932

19 Claims. (Cl. 103—7)

This invention relates to fluid pressure systems and more particularly to a fluid pressure system for use in connection with hydraulic brakes or the like.

In mine hoists or the like, the drum on which the hoist cable is wound is necessarily large and heavy. Such drums are usually controlled by brakes which are held set constantly by a plurality of weights and released by a hydraulic cylinder which counteracts the weights to release the brake when it is desired to operate the hoist. In order to insure proper operation of the drum, it is necessary to have a large reserve tank of oil under constant high pressure.

In some oil reserve tanks the level of oil in the tank is maintained by an oil pump, which pumps against air pressure in the tank. The air in the tank is supplemented continuously with air introduced into the intake of the pump through a snifter valve. This system has the disadvantage that the air so snifted has a tendency to remain in suspension and therefore may be carried away in greater volume than supplied. The air in suspension results in erratic or spongy operation when used to actuate the brake.

One object of the present invention is to provide a pressure system for hydraulic brakes which will automatically maintain the proper supply of oil and air in the pressure reserve tank.

Another object is to provide a pressure system for hydraulic brakes, or the like, in which the oil will contain a minimum of air in suspension.

A further object is to provide a pressure system for hydraulic brakes, or the like, which will insure uniform brake action.

A still further object is to provide a pressure system for hydraulic brakes, or the like, in which air is automatically separated from the oil or other brake fluid.

A further object is to prevent spongy operation of the brakes.

Another object is to provide a pressure system for hydraulic brakes, or the like, in which air is automatically replenished as it is depleted.

Other objects will become apparent upon considering the following specification, which, when taken in connection with the accompanying drawings illustrate a preferred type of the invention.

In terms of broad inclusion the invention comprises a pressure tank adapted to retain brake fluid or the like under pressure, a pump adapted to supply brake fluid to said tank, means to introduce air into the brake fluid on the suction side of the pump, and means on the pressure side of the pump to separate the air from the brake fluid.

In the drawings:

Fig. 4 is an enlarged cross-sectional, elevational view through the control valve shown in Fig. 1; and Fig. 5 is a cross-sectional elevational view of the control valve taken on a plane at right angles to that of Fig. 4.

Figure 1:
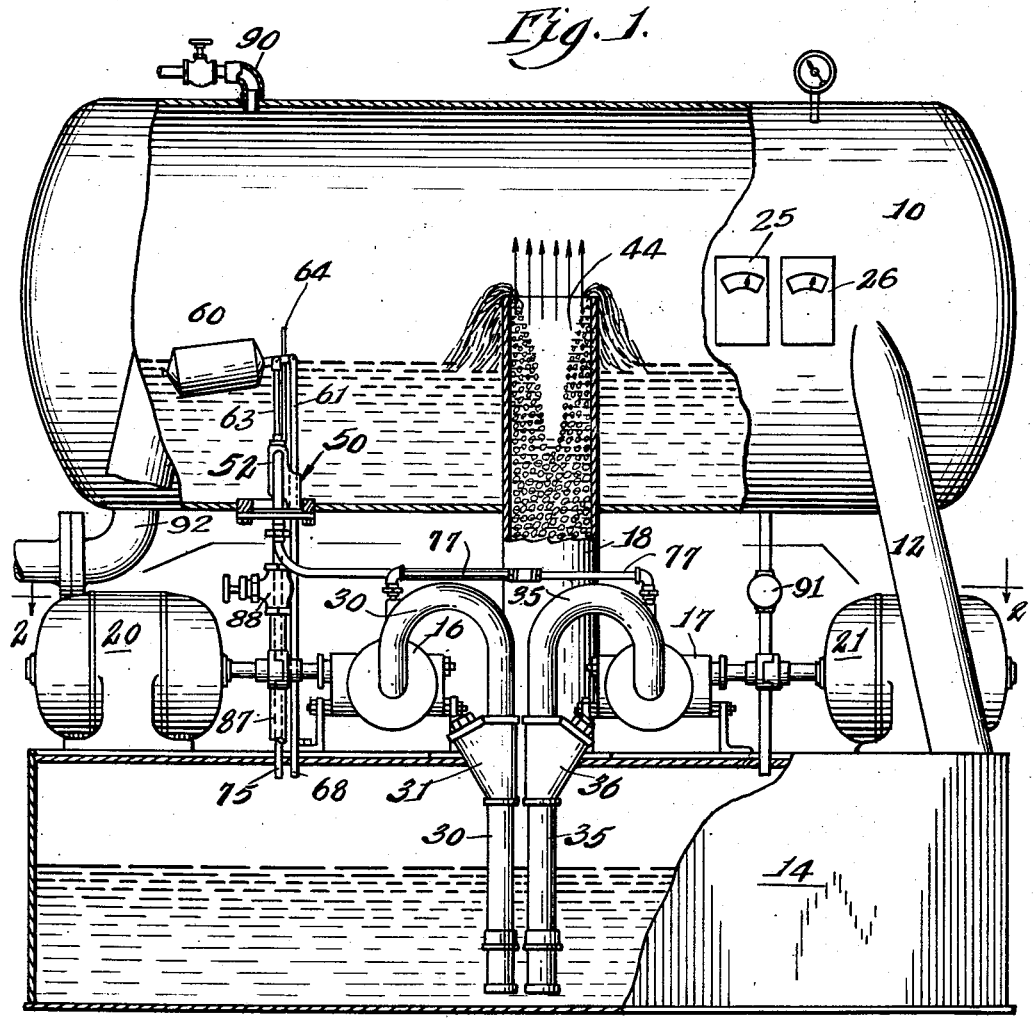
Fig. 1 is an elevational view, partly in cross-section, of a pressure tank for a hydraulic brake system embodying the present invention.
Figure 2:
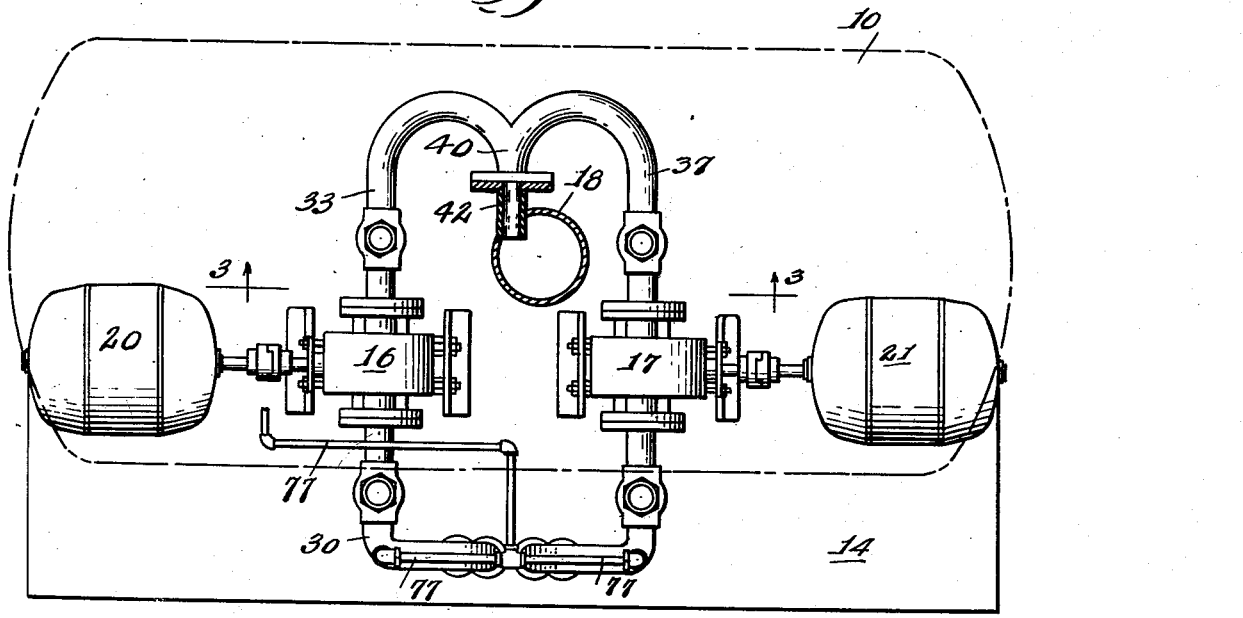
Fig. 2 is a cross-section taken on the line 2—2 of Fig. 1, looking in the direction of the arrows.
Figure 3:
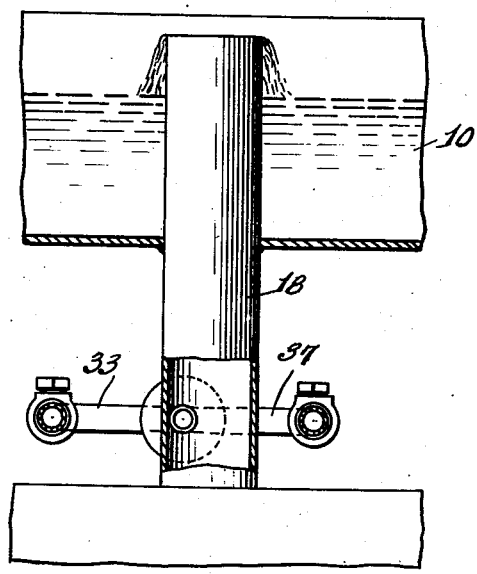
Fig. 3 is a cross-section taken on the line 3—3 of Fig. 2, looking in the direction of the arrows.

Referring to the drawings, the pressure system for the hydraulic apparatus comprises a pressure tank 10, mounted by means of a plurality of posts 12 on top of a sump tank 14 with a pumping system comprising a pair of positive displacement pumps 16 and 17 drawing the oil or other fluid from the sump tank 14 and delivering it under pressure to the lower part of a circular standpipe 18 which is closed at the bottom and projects through the lower side of the pressure tank 10. The pumps 16 and 17 are actuated by motors 20 and 21, mounted adjacent the pumps 16 and 17 and on the top of the sump tank 14.

The motors 20 and 21 are controlled by pressure control switches 25 and 26, respectively, which start the motors 20 and 21 when the pressure within the tank 10 falls below a predetermined minimum and shut the motors off when the pressure within the tank reaches a desired maximum.

The switches 25 and 26 are so arranged that pressure switch 25 will cut the motor 20 in as the pressure drops to within a few pounds of the desired minimum, and the pressure switch 26 will cut in the motor 21 when the pressure of air reaches the desired minimum. Both switches 25 and 26 operate to cut off the motors 20 and 21 when the air pressure builds up to the desired maximum.

The pump 16 is adapted to draw oil or brake fluid from the sump tank 14 through a suction pipe 30, past a screen 31, through the pump 16 and discharge the oil from the pump at increased pressure through a pipe 33.

Similarly the pump 17 is adapted to draw oil or brake fluid from the sump tank 14 through a suction pipe 35, past a screen 36, through the pump 17 and discharge it at increased pressure through a pipe 37.

The discharge pipes 33 and 37 join in a Y 40 which discharges into a pipe 42. The pipe 42 enters the lower end of the standpipe 18 at one side thereof, so that the oil discharged from the pump enters the standpipe 18 tangentially and causes the oil to assume a whirling motion, the whirling motion creating a vortex as shown at 44. The centrifugal force created by the whirling fluid causes air entrained and suspended in the fluid to be forced toward the center and escape through the surface of the vortex 44.

The level of the oil in the reservoir 10 and the amount of air above the surface of the oil are both governed by a float control valve, generally designated 50, and best seen in Figs. 4 and 5.

Referring to the details of the control valve 50, as seen in Figs. 4 and 5, the valve comprises a body portion 52, having a vertical aperture 53 therethrough, which accommodates a multiple plunger valve 54. The multiple plunger valve 54 comprises three separate plungers 55, 56 and 57 fixed on a common stem. Movement of the plunger valve 54 is effected by a float 60. The float 60 is pivoted on a standard or post 61 and actuates the valve 54 through a connecting rod 63.

When the tank 10 is empty the float 60 and the valve 54 are in their lowermost position, as seen in Fig. 5. At that time, any air under pressure in the tank 10 is exhausted through a vent pipe 64 which opens into the tank 10 above the minimum desirable oil level therein and leads into a port 65 in the aperture 53 just above the lowermost position of the plunger 57. Air passing out through the vent pipe 64 passes upwardly past the lower edge of the plunger 56, and out through an opening 67 in the valve body 52. The opening 67 has a pipe 68 connected thereto which opens into the sump tank 14, so that the top of the plunger 57 is below the port 65, air under pressure in the tank 10 vents from the tank 10 through the pipe 64, past the plungers 57 and 56, through the opening 67 and the pipe 68 and into the top of the sump tank 14 which is open to the atmosphere.

As the oil level in the tank 10 builds up, the float rises, lifting the plunger valve 54 covering the port 65 with the plunger 57 to prevent further escape of air from the tank 10. As the level of the oil in the tank 10 rises above a desired minimum the plunger 55 uncovers a pair of ports 72—73, permitting air to flow at atmospheric pressure from the sump tank 14, through a pipe 75, into the port 72, past the plunger 55, into the port 73, and out through a pipe 77, and into the intake pipes 30 and 35 of the pumps 16 and 17 permitting the pumps 16 and 17 to pump a mixture of oil and air. Thus the pumps serve, not only to replenish the oil in the tank 10, but also to replenish the air.

When the oil level reaches a desired maximum, the plunger 56 uncovers a port 80 which opens into the tank 10 and permits oil to drain from the tank 10, through the port 80, past the plunger 56, through the opening 67 and pipe 68 into the sump tank 14. The oil continues to drain through the port 80 until the level of the oil in the tank again drops below the desired maximum.

The pumps 16 and 17 continue to operate until the air pressure in the tank builds up to the maximum desired, at which time the pressure switches 25 and 26 operate to shut off power to the motors 20 and 21, stopping the pumps.

The multiple plunger valve 54 is retained in the aperture 53 by a pair of pins 82—83 which pass through the valve 54 at the top and bottom thereof, respectively, and contact the body 52 of the valve at the desired upper and lower limits of the plungers.

The three controls, namely the pressure control valves 25 and 26, the plunger valve 55 controlling the admission of air into the intakes 30 and 35 of the pumps 16 and 17, and the valve 56 controlling the discharge of surplus oil from the tank 10, all cooperate to maintain a sufficient supply of oil in the tank, together with a sufficient air cushion to minimize pressure fluctuation as the oil level in the tank changes.

A drain pipe 87 is connected to a port in the bottom of the valve 50 to drain all oil from the tank 10 at such time as it may be desirable to do so. The pipe 87 has a hand operated valve 88 to control the draining operation.

The top of the tank 10 may be supplied with a compressed air connection 90 through which compressed air may be supplied, if available, to decrease the time necessary to build up pressure through the pumps 16 or 17.

A safety valve 91 is provided in the bottom of the tank 10. The valve 91 is set to empty the tank 10 when the pressure within the tank is excessive.

Operation

In operation, the system may be started with oil in the sump tank 14 and neither oil nor pressure in the pressure tank 10, or there may be oil and pressure in the pressure tank. When the current is switched on with no oil or pressure in the tank 10, the switches 25 and 26 start both motors 20 and 21 which actuate pumps 16 and 17, respectively, to pump oil from the sump tank 14, through the pipes 30 and 35 and the screens 31 and 36, into the pumps 16 and 17 and out of the pumps through the pipes 33 and 37, past the Y 40, through the pipe 42 and into the standpipe 18 tangentially to its periphery. As the oil enters the standpipe 18 tangentially under pressure it assumes a whirling motion which, as it rises in the standpipe, creates the vortex 44. The centrifugal force of the whirling oil forces the heavy oil outward and forces the lighter air in the oil toward the center of the vortex, and out into the free air in the top of tank 10. The vortex further creates a large area through which the air may escape more readily. The oil, thus freed of air spills over the upper lip of the standpipe 18 into the bottom of the tank 10.

Until the oil has risen to a predetermined level the air in the top of the tank passes out through the pipe 64, through the ports 65 and 67 and through the pipe 68 to the top of the sump tank 14, which is open to the atmosphere.

As the level of the liquid rises, the float 60 moves upwardly raising the multiple plunger valve 54, and closing communication between the pipes 64 and 68.

Further raising of the level of the liquid causes the plunger 55 to open communication between the ports 72 and 73 which permits air to pass from the atmosphere in the top of the sump tank 14, through the pipe 75, through the ports 72 and 73 in the valve body, and through the pipe 77 into the intake pipes 30 and 35 of the pumps 16 and 17. Thus as the pumps continue to pump oil they simultaneously draw air from the atmosphere into the intakes of the pumps and pump it with the oil into the tank 10 to raise the air pressure within the tank. The air so introduced into the oil during pumping is separated from the oil by centrifugal force resulting from the oil whirling in the standpipe 18, as explained above.

As the air pressure in the tank 10 is built up by the introduction of air the oil level continues to rise in the tank due to the simultaneously pumping of oil and air until the plunger 56 uncovers the port 80. At that point oil bleeds out through the ports 80 and 67 and through the pipe 68 into the sump tank 14. During the time the oil is draining, air continues to flow through the valve 50 and into the intake of the pumps 16 and 17 to build up the air pressure within the oil pressure tank 10.

When the pressure has risen to a predetermined maximum, the pressure actuated switches 25 and 26 cut out the motors 20 and 21 to stop the pumping of both oil and air. After pumping has ceased, oil will continue to drain back into the sump tank 14, through the ports 80, 67 and the pipe 68, until the level of liquid falls to a point where the float 60 moves the plunger 56 downward to shut off the port 80.

When it is desired to release the brake, oil is delivered to the brake cylinder from the oil pressure tank through a supply pipe 92. When a predetermined amount of oil has been withdrawn through the pipe 92, the air pressure will drop sufficiently to permit the switch 25 to cut in the motor 20 operating the pump 16. Should oil continue to be withdrawn at a greater rate than it is replenished, the pressure in the tank will continue to fall, and the switch 26 will then cut in the motor 21 starting the second pump 17.

If compressed air is available, the time required to build up the necessary pressure in the tank 10 may be decreased considerably by charging the tank with compressed air through the pipe 90 when the tank is partly filled with oil.

In the event the pressure should at any time become great enough to affect the safety of operation, a safety valve 91 will open, permitting oil to flow out of the tank 10 into the oil sump tank 14.

It is to be understood that the form of the invention herein shown and described is to be taken merely as a preferred example thereof, and that various changes in size, shape and arrangement of parts may be resorted to without departing from the spirit of the invention or the scope of the subjoined claims.

That which is claimed as new and is desired to be secured by Letters Patent is:

1. In a device of the character described, an oil pressure tank, a pump adapted to deliver oil to said tank, means within said tank to introduce air into the oil pump on the suction side thereof when the air in the top of the tank becomes depleted, said last named means continuing to function until the air pressure reaches a desired maximum and the liquid level reaches a desired minimum.

2. In an oil pressure reserve tank for hydraulic brakes or the like, a pump adapted to deliver oil and air to said tank, and means in said tank to drain oil from said tank when the liquid level in the tank is above a desired maximum.

3. In an oil pressure tank for hydraulic brakes or the like, a pump adapted to deliver a mixture of oil and air to said tank, means in said tank to govern the flow of air into the oil being pumped, means to drain oil from the tank after the oil has exceeded a predetermined maximum level, and means to stop the pump when the air pressure in the tank reaches a predetermined maximum.

4. In an oil pressure reserve tank for hydraulic brakes or the like, a pump adapted to deliver oil and air to said tank, means in said tank to drain oil from said tank when the level of oil in the tank is above a predetermined maximum, and means to separate air from the oil within said tank.

5. In an oil pressure tank for hydraulic brakes or the like, a pump adapted to deliver a mixture of oil and air to said tank, means in said tank to govern the flow of air into the oil being pumped, means to drain oil from the tank when the oil level exceeds a predetermined maximum, means to separate air from the oil within said tank, and means to stop said pump when the air pressure in said tank reaches a desired maximum.

6. In a device of the character described, an oil pressure tank, a standpipe mounted in the bottom of said tank projecting therebelow, and communicating with the tank at the upper end of the standpipe, a pump adapted to deliver oil into said standpipe, means to actuate said pump, pressure responsive means adapted to start the motor when pressure within the tank drops below a desired minimum, and to stop the motor when pressure within the tank reaches a desired maximum, means within said tank to bleed air into the oil being pumped when the level of oil within the tank reaches a desired minimum and means to bleed oil out of said tank when the level therein exceeds a desired maximum.

7. A device as defined in claim 6 including means to effect separation of the air in suspension from the oil entering the tank.

8. A device as recited in claim 6 including means to create a centrifugal force within said standpipe to separate air in suspension from the oil.

9. In a device of the character described an oil pressure tank, a standpipe mounted in the bottom of said tank projecting therebelow, and communicating with the tank at the upper end of the standpipe, a pump adapted to deliver oil into said standpipe tangentially thereto, means to actuate said pump, pressure responsive means adapted to start the motor when pressure within the tank drops below a desired minimum, and to stop the motor when pressure within the tank reaches a desired maximum, means to bleed air into the oil being pumped when the level of oil within the tank is above a desired minimum, and means to bleed oil out of said tank when the level therein exceeds a desired maximum.

10. In a device of the character described, a sump tank, a pressure tank mounted on said sump tank, a standpipe having a closed lower end projecting through the lower part of said pressure tank, opening into said pressure tank and terminating above said sump tank, a pump mounted on said sump tank, a motor adapted to actuate said pump, a pressure responsive switch adapted to cut in the motor when pressure in the tank drops below a predetermined minimum and cut out the motor when the pressure reaches a predetermined maximum, an intake pipe for said pump extending into said sump tank, an exhaust pipe for said pump delivering fluid to said standpipe adjacent the bottom thereof and tangentially thereto, and a valve within said pressure tank adapted to deliver air to said intake pipe when the liquid level in the pressure tank exceeds a desired minimum and to drain oil from said pressure tank when the liquid level exceeds a desired maximum.

11. In an oil pressure reserve tank for hydraulic brakes or the like, a pump adapted to deliver oil and air to said tank, and a float controlled valve adapted to drain oil from said tank when the liquid level in the tank is above a desired maximum.

12. In an oil pressure reserve tank for hydraulic brakes or the like, a pump adapted to deliver oil and air to the tank, a float controlled valve adapted to drain oil from said tank when the level of the oil in the tank is above a predetermined maximum, and means opening into said tank to separate the air from the oil.

13. In an oil pressure reserve tank for hydraulic brakes or the like, a pump adapted to supply a mixture of air and oil to said tank, a float controlled valve adapted to govern the flow of air into the oil being pumped and to drain oil from said tank when the level of oil therein is above a predetermined maximum, and means opening into said tank to separate the air from the oil.

14. An oil pressure reserve tank for hydraulic brakes or the like, as defined in claim 13, including a pressure actuated switch operable upon the attainment of a desired maximum air pressure within said tank to stop said pump.

15. In an oil pressure reserve tank a pump adapted to deliver a mixture of air and oil to the tank, and a valve adapted to vent air when the level of oil is below a desired minimum and to deliver air to said pump when the level of oil is above a desired minimum.

16. In a pressure system for hydraulic brakes or the like, a tank, a pump adapted to deliver a mixture of liquid and air to said tank under pressure, and a float controlled valve to direct air into the liquid being pumped when the level of oil in the tank is above a desired minimum, to drain oil from the tank when the level of oil is above a desired maximum, and to vent air from the tank when the level of oil is below a desired minimum.

17. In a device of the character described, an oil pressure tank, a pump adapted to deliver oil to said tank, and means to introduce air into the oil entering the pump to replenish the air in the tank until both the air pressure and the liquid level reach predetermined amounts.

18. In an oil pressure reserve tank for hydraulic brakes or the like, a pump adapted to deliver oil and air to the tank, a float controlled valve adapted to drain oil from said tank when the level of the oil in the tank is above a predetermined maximum, and means opening into said tank above the upper maximum level of oil therein to separate the air from the oil.

19. In an oil pressure reserve tank for hydraulic brakes or the like, a pump adapted to supply a mixture of air and oil to said tank, a float controlled valve adapted to govern the flow of air into the oil being pumped and to drain oil from said tank when the level of oil therein is above a predetermined maximum, and means opening into said tank above the upper maximum level of oil therein to separate the air from the oil.

JOSEPH KELLOGG.

REFERENCES CITED

The following references are of record in the file of this patent:

UNITED STATES PATENTS

| Number | Name | Date |
|---|---|---|
| 1,372,928 | Barton | Mar. 29, 1921 |
| 1,475,683 | Carrey | Nov. 27, 1923 |
| 1,549,786 | Mohr | Aug. 13, 1925 |
| 1,567,148 | Jennings | Dec. 29, 1925 |
| 1,623,103 | Frederick | Apr. 5, 1927 |
| 1,749,797 | Anderson et al. | Mar. 11, 1930 |
| 2,228,401 | Pressler | Jan. 14, 1941 |
| 2,327,601 | Kent | Aug. 24, 1943 |
| 2,347,472 | Dorward | Aug. 25, 1944 |

FOREIGN PATENTS

| Number | Country | Date |
|---|---|---|
| 418,836 | Great Britain | 1934 |
| 785,896 | France | 1935 |